Feb. 11, 1969  H. I. ANDERSON  3,426,691
PUMP EXPANSION CHAMBER
Filed April 4, 1967
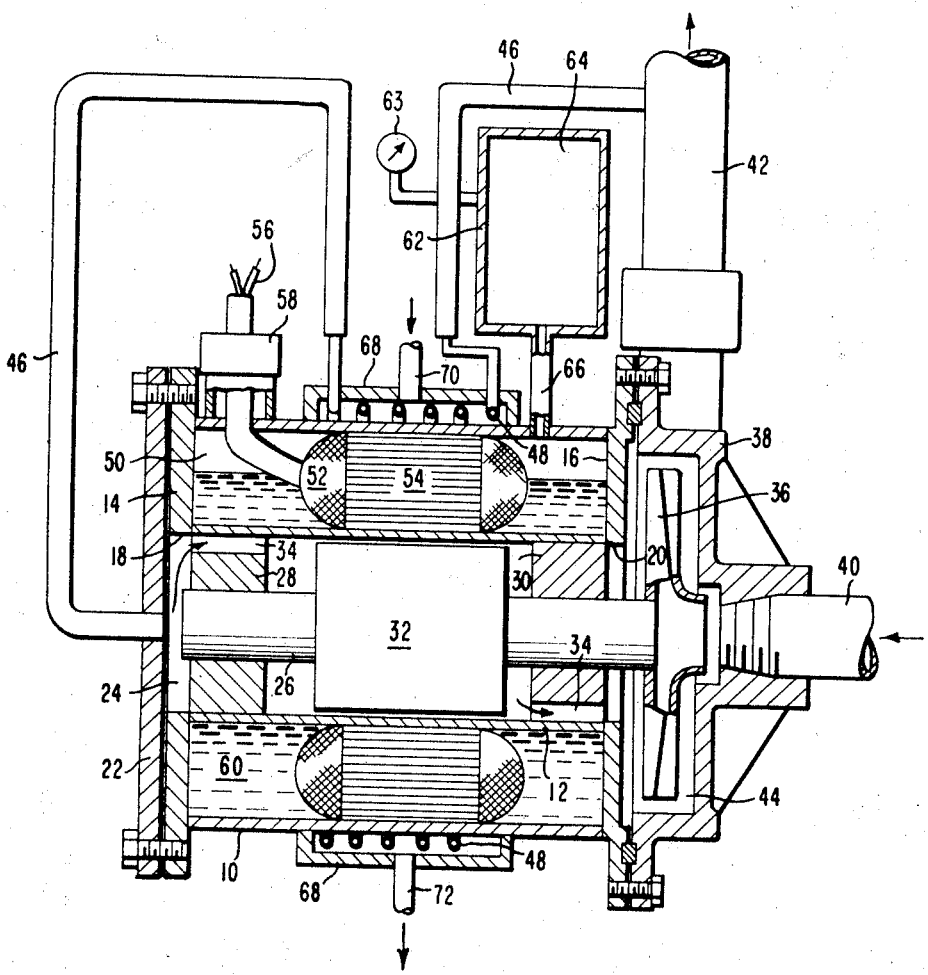
INVENTOR
HOWARD IRVINE ANDERSON
BY Howard P. West Jr.
ATTORNEY

United States Patent Office 3,426,691
Patented Feb. 11, 1969

3,426,691
PUMP EXPANSION CHAMBER
Howard Irvine Anderson, Petersburg, Va., assignor to E. I. du Pont de Nemours and Company, Wilmington, Del., a corporation of Delaware
Filed Apr. 4, 1967, Ser. No. 628,468
U.S. Cl. 103—87
Int. Cl. F04d 3/06, 29/58; H02k 5/12
2 Claims

ABSTRACT OF THE DISCLOSURE

An expansion chamber for use with a combination motor driven pump arrangement wherein the pumped fluid is circulated through the motor for cooling and bearing lubrication. The chamber is in communication with a sealed dielectric fluid containing stator cavity in the motor housing for the dual purpose of absorbing pressure developed in the cavity due to thermal expansion of the dielectric fluid and containing pumped fluid in the event of an internal rupture of the motor housing permitting pumped fluid to flow into the stator cavity.

BACKGROUND OF THE INVENTION

This invention relates to motor driven centrifugal pumps and more particularly to a combination motor-pump arrangement for pumping liquid wherein the motor and pump housings are an integral unit.

In many instances, these pumps are designed to be lubricated and cooled by the liquid being pumped. This may be accomplished by passing part of the liquid through the bearings and rotor cavity. Such a pump is described in U.S. Patent 2,906,208 to White dated Sept. 29, 1959.

In some cases it is desirable to partially fill the stator cavity with a dielectric heat transfer fluid to facilitate cooling of this area of the motor. When this is done, it is frequent practice to provide a safety valve in the outer housing of the stator cavity to relieve the pressure and prevent rupture of the relatively thin liner between the stator and rotor cavities if excessive pressures arise due to thermal expansion of the dielectric fluid. This will occur if the cavity is filled to capacity. Such valves are set for release at a relatively low pressure to prevent inward bulging of this liner in event of pump cavitation. The bulging of the liner will cause rubbing contact between the liner and the rotor of the motor which in turn would result in a rupture in the liner. However, when the pump is used to pump a liquid such as Dowtherm [1] (the eutectic mixture of diphenyl and diphenyl oxide) at relatively high temperatures as is common practice in the heating of vessels used in the production of synthetic polymers, a serious problem arises in the use of pressure relief valves with these pumps. This is due to the fact that the relatively thin liner which separates the stator and rotor cavities occasionally fails due to wear, e.g., from a misaligned rotor, with the result that the hot Dowtherm passes into the stator cavity. When this happens, the pressure in the stator cavity is increased sufficiently to unseat the pressure relief valve and hot Dowtherm is sprayed throughout the area. This is dangerous to personnel working in the area and there is a high probability of the Dowtherm vapor igniting to cause a serious fire.

SUMMARY OF THE INVENTION

It is an object of this invention to provide an improvement in a combination motor-pump used for pumping fluids at high pressures and temperatures whereby pressure in the motor stator cavity is controlled and ejection of fluid outside the motor-pump combination is prevented in the event of a rupture of the motor housing between the rotor and stator.

The above object is accomplished, in a motor driven pump having a rotor cavity through which the pumped fluid circulates and a sealed stator cavity partially filled with a dielectric oil, by a container having a sealed gas filled expansion chamber connected to the upper portion of the stator cavity. By appropriate sizing of the expansion chamber relative to the size of the stator cavity and the temperature increases which occur, the pressure within the stator cavity can be controlled within safe limits so that no pressure relief valve is needed. Since no relief valve is required, there is no loss of fluid outside the pump in the event of a rupture of the motor housing between the stator and rotor cavities.

BRIEF DESCRIPTION OF THE DRAWING

A partially sectioned elevation of the preferred embodiment is illustrated in the drawing.

DESCRIPTION OF THE PREFERRED EMBODIMENT

Referring now to the drawing, a motor housing is provided having an outer cylindrical portion 10 and a hollow relatively thin sleeve 12 joined together at each end by end plates 14, 16 having respective axial openings 18, 20 therethrough. A closure plate 22 bolted to end plate 14 seals off opening 18 to form a rotor cavity 24. Supported within cavity 24 by shaft 26 and sleeve bearings 28, 30 is a rotor 32. Bearings 28 and 30 are similar and each is provided with grooves 34 around their outer peripheries to permit fluid flow as indicated by the arrows. Attached to one end of shaft 26 for rotation therewith is pump impeller 36.

An impeller housing 38, having an axially disposed inlet pipe 40 and a discharge pipe 42, is fastened to end plate 16 forming a sealed impeller chamber 44. Pipe 46 connects pump discharge pipe 42 with rotor cavity 24 through heat exchange coils 48.

The space between cylindrical portion 10, sleeve 12 and end plates 14, 16 of the motor housing provides a sealed, motor stator cavity 50 disposed in which are motor stator field windings 52 and motor field laminations 54. Conductors 56 enter stator cavity 50 through a high pressure conduit seal 58 and are connected to field windings 52 for energization thereof. Conductors 56 may be connected to any suitable source of alternating current. Stator cavity 50 is partially filled, to a level reaching into the upper portion of the cavity 50, with a dielectric heat transfer fluid 60, e.g., a silicone oil such as G.E., S.F. 97. A container 62 having a gas filled chamber 64 is connected to cylindrical portion 10 by means of conduit 66, to place chamber 64 and stator cavity 50 in communication. A water cooled jacket 68, having an inlet 70 and an outlet 72, surrounds heat exchange coils 48 and outer cylindrical portion 10 of the motor housing.

In normal operation the stator cavity 50 is filled to about 60% of its volume with dielectric oil 60 to allow for thermal expansion without creating an overpressure in the cavity. The pump is used to discharge Dowtherm at temperatures in the range of 250–275° C. and pressures of the order of 100 p.s.i.g. through pipe 42. A portion of the hot liquid is carried by conduit 46 to heat exchange coils 48 where the temperature of the liquid is reduced to a desired level before it is introduced into rotor cavity 24. The liquid passes through rotor cavity 24, bearings 28, 30 and into chamber 44. The circulation of the liquid in this manner is effective for cooling the motor and lubricating the bearings. If in the course of assembly of the motor and pump the stator cavity is overfilled with dielectric oil as occasionally happens, the thermal expansion of the oil under operating conditions will not cause a detrimental

[1] Registered trademark.

increase in pressure in the sealed stator cavity as would be experienced with prior art motor driven pumps of this type without positive pressure relief. Instead the thermal expansion of the oil will only cause a slight compression of the air in chamber 64. The sizing of chamber 64 is not highly critical, however, it is desirable that this chamber have a volume of at least about 20% of volume of stator cavity 50. Thus if the stator cavity is inadvertently filled to capacity there remains sufficient space for expansion of the oil under operating conditions without experiencing an excessive pressure in the stator cavity. In the event that sleeve 12 ruptures due to rubbing contact with rotor 32 caused by bearing wear or misalignment or other reasons, the hot, pressurized liquid being pumped will be contained within the motor housing and container 62 and no hazardous conditions will be created by this failure.

From this it can be readily seen that the replacement of the safety relief valve on prior art motor driven pumps of this type with a properly sized expansion chamber will provide overpressure protection as well as positive sealing of the motor driven pump in the event of an internal failure. If desired, container 62 may be equipped with a pressure gauge 63 so that a liner failure may be detected quickly by the increase in pressure which will result.

What is claimed is:
1. In a motor driven pump of the type which includes a pump housing and a motor housing connected to the pump housing, the motor housing being provided with a sealed stator cavity, containing dielectric heat transfer liquid and a rotor cavity in communication with the pump housing, an apparatus for controlling the pressure in the stator cavity due to thermal expansion of the dielectric liquid and for containing the liquid being pumped in the event a rupture of the housing occurs between the rotor and stator cavities, said apparatus comprising:
   a container connected to the motor housing, said container having a gas filled sealed chamber in communication with the upper portion of the stator cavity, said sealed chamber having a volume of at least about 20% of the volume of the stator cavity.
2. The apparatus of claim 1 wherein is provided a pressure gauge connected to said container, said gauge being in communication with said sealed chamber.

References Cited

UNITED STATES PATENTS

| | | | |
|---|---|---|---|
| 2,687,695 | 8/1954 | Blom et al. | 103—87 |
| 3,052,804 | 9/1962 | Komor | 310—87 |

ROBERT M. WALKER, *Primary Examiner.*

U.S. Cl. X.R.

310—87